2,818,449

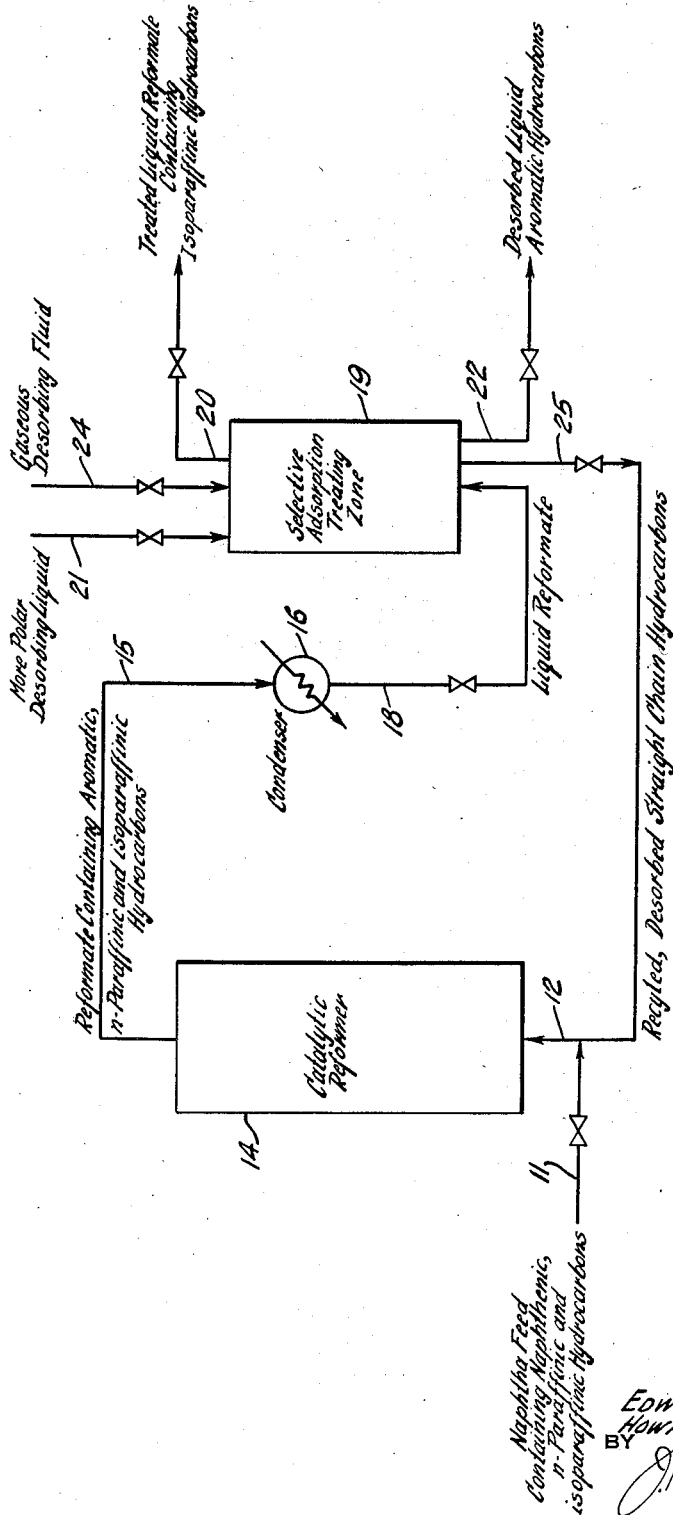

METHOD FOR SEPARATION OF ORGANIC MIXTURES

Edward R. Christensen, Beacon, and Howard V. Hess, Glenham, N. Y., assignors to The Texas Company, New York, N. Y., a corporation of Delaware Application April 8, 1955, Serial No. 500,296

8 Claims. (Cl. 260—666)

This invention relates to a method for the separation or fractionation of organic mixtures. In a more specific embodiment, the invention relates to a method of separating and upgrading petroleum fractions through the use of solid selective adsorbents.

It is known to employ solid selective adsorbents for the separation of organic mixtures into components having different characteristics. Thus, for example, a mixture of normal butane and isobutane may be separated into its two components by contacting the mixture, preferably in the vapor phase, with a solid adsorbent exhibiting the property of selective adsorption toward one of the components. The normal butane-isobutane mixture might be contacted with a dehydrated crystalline aluminosilicate in which step the normal butane is selectively adsorbed by the adsorbent leaving an effluent that is substantially pure isobutane.

The separation referred to above is dependent upon the pore size of the absorbing material in order to be operative. Solid adsorbents employed in such separations have pores or internal passages of molecular dimensions measuring about 5 Angstrom units in diameter. Pore openings of this size will permit the entrance and adsorption of hydrocarbon molecules of the normal or straight chain configuration while at the same time excluding branched chain or cyclic compounds from the pores because their molecular dimensions are too great, i. e. in excess of about 5 Angstron units. The actual molecular dimensions of the organic compounds, therefore, serve as one basis for their separation and it is for this reason that solid adsorbents employed to effect separation of a mixture of compounds in accordance with their molecular dimensions have been termed molecular sieves.

We have discovered that certain solid adsorbents of the type referred to also have under certain conditions an affinity for relatively more-polar compounds over relatively less-polar compounds. Thus, in a liquid mixture of polar compounds and non-polar compounds, or a liquid mixture of relatively more-polar compounds and relatively less-polar compounds, the polar or more-polar compounds will also be selectively adsorbed on the solid adsorbent. This phenomenon cannot be explained on the same basis set forth to explain the adsorption of straight chain compounds, i. e. molecular sieve effect. In instances where polar compounds have been adsorbed it is known that the molecular dimensions of the polar compounds do not permit their entrance into the pores of the adsorbent.

A method has now been discovered for separating organic mixtures into at least three components in a single adsorption step by employing solid selective adsorbents under prescribed conditions of contact and separation.

It is a principal object of this invention, therefore, to provide an improved method for the separation of organic mixtures.

Another object is to provide a method for fractionating complex or multiple component organic mixtures into at least three characteristically distinctive components by employing a single adsorption step.

A further object is to provide a method for upgrading petroleum fractions containing straight chain and non-straight chain hydrocarbons, including paraffins and olefins, naphthenic and aromatic compounds by separating the petroleum fraction into at least three components.

A still further object is to separate complex organic mixtures consisting of straight chain hydrocarbons, non-straight chain more-polar compounds and non-straight chain relatively less-polar compounds by contacting the mixture in the liquid phase with a solid selective adsorbent of the alumino-silicate class and then separating the treated mixture into the aforementioned components.

How these and other objects of this invention are accomplished will become apparent in the light of the accompanying specification made with reference to the accompanying drawing wherein one embodiment of the practice of this invention involving catalytically reforming a naphtha feed followed by selectively separating from the resulting reformate a treated reformate, aromatic hydrocarbons and straight chain hydrocarbons which are recycled to the catalytic reforming operation, is schematically illustrated.

The objects of this invention are accomplished by selecting an organic mixture consisting of at least three characteristically distinct components as, for example, a mixture of normal and isoparaffinic hydrocarbons and unsaturated or aromatic or non-straight chain polar compounds, and contacting this mixture in the liquid phase with a solid selective adsorbent exhibiting selective pore adsorbent properties for normal paraffinic hydrocarbons and selective surface adsorbent properties for the non-straight chain polar or aromatic compounds and, thereafter, physically separating the unadsorbed isoparaffinic hydrocarbons, selectively desorbing the surface adsorbed non-straight chain polar or aromatic or unsaturated compounds and finally separately desorbing the pore-adsorbed normal paraffinic hydrocarbons.

The unadsorbed portion of the organic mixture, or so-called raffinate consisting of isoparaffinic hydrocarbons may be readily separated from the adsorbent by physical means, such as decantation and filtration. The second component of the original organic mixture representing the non-straight chain or unsaturated polar or aromatic compounds adsorbed on the surface of the solid adsorbent may be separately and selectively desorbed from the adsorbent. The third component of the original organic mixture representing straight chain hydrocarbons, e. g., n-paraffins, which are adsorbed within the pores of the adsorbent may be separately recovered from the adsorbent following the desorption of the surface adsorbed non-straight chain polar or aromatic compounds.

The adsorption phenomena described above, i. e., the internal or pore adsorption of straight chain hydrocarbons, and the surface adsorption of the non-straight chain more-polar or aromatic compounds does not occur to any significant extent under all conditions. In fact, vapor phase contacting apparently does not give rise to any appreciable amount of surface adsorption. The concurrence of pore adsorption and surface adsorption apparently only takes place to any significant extent when the mixture undergoing separation is in the liquid phase, i. e., under liquid to solid contacting conditions.

The term straight chain hydrocarbons is meant to include any of the normal paraffins, normal olefins, normal polyolefins or normal acetylenic hydrocarbons, such as n-butane, n-butene, n-pentane, butadiene and their higher molecular weight homologues. The term non-straight chain hydrocarbons refers to any aliphatic or acyclic organic compound which possesses side chain branching or any aromatic or naphthenic compounds, e. g. hydrocarbons, containing at least four cyclic carbon atoms or compounds containing one or more heterocyclic or $C_6$ carbocyclic rings. According to the practice of the invention, organic mixtures of varying compositions may be fractionated so long as there are present non-straight chain compounds of varying polarity or aromatic and non-straight chain compounds together with straight chain hydrocarbons. The process is particularly valuable for separating hydrocarbon fractions which contain straight chain hydrocarbons, e. g., n-paraffins and non-straight chain polar organic compounds or unsaturated or aromatic hydrocarbons in the presence of non-straight chain less-polar or non-polar compounds, e. g., naphthenic or isoparaffinic hydrocarbons.

Any solid adsorbent which selectively adsorbs straight chain hydrocarbons within its pores and which selectively adsorbs more-polar or aromatic compounds on its surface can be employed in the practice of this invention. It is preferred, however, to employ as the adsorbent certain natural or synthetic zeolites or alumino-silicates, such as calcium alumino-silicate, which exhibits the property of a molecular sieve, i. e., any inorganic material or alumino-silicate made up of porous crystals wherein the pores of the crystals are of molecular dimension and are of uniform size. A particularly suitable solid adsorbent is a calcium alumino-silicate manufactured by Linde Air Products Company and designated Linde Type 5A molecular sieve. The crystals of this particular calcium alumino-silicate, apparently actually a sodium calcium alumino-silicate, have a pore size of about 5 Angstrom units, a pore size sufficient to admit straight chain hydrocarbons to the substantial exclusion of non-straight chain hydrocarbons such as the naphthenic, isoparaffinic iso-olefinic and aromatic hydrocarbons.

Other solid selective adsorbents may be employed, in the practice of the invention. For example, it is contemplated that selective solid adsorbents having the property of selectively adsorbing straight chain hydrocarbons within their pores to the substantial exclusion of non-straight chain hydrocarbons in the manner of a molecular sieve, and also possessing the property of adsorbing non-straight chain more-polar or aromatic or unsaturated compounds on their surfaces may be obtained by suitable treatment of various oxide gels, especially metal oxide gels of the polyvalent amphoteric metal oxides.

Other suitable solid selective adsorbents are known and include the synthetic and natural zeolites which, when dehydrated, may be described as crystalline zeolites having a rigid three dimensional anionic network and having interstitial dimensions sufficiently large to adsorb straight chain hydrocarbons but sufficiently small to exclude non-straight chain hydrocarbons. The naturally occurring zeolite chabazite exhibits such desirable properties. Another suitable naturally occurring zeolite is analcite, $$NaAlSi_2O_6 \cdot H_2O$$

which when dehydrated and when all or part of the sodium is replaced by calcium, yields a material which may be represented by the formula $(Ca,Na_2)Al_2Si_4O_{12} \cdot 2H_2O$, and which, after suitable conditioning, will adsorb straight chain hydrocarbons within its pores to the substantial exclusion of non-straight chain hydrocarbons. Naturally occurring or synthetically prepared phacolite, gmelinite, harmotone, and the like or suitable modifications of these produced by basic exchange are also operable.

Contacting the liquid organic mixture to be separated may be accomplished by adding the solid adsorbent to the organic mixture in a suitable container thereby forming a slurry. The slurry may be agitated or mixed for a sufficient length of time to insure internal or pore adsorption of the straight chain hydrocarbons and surface adsorption of the more-polar components of the mixture.

Contact of the organic mixture with the solid adsorbent may be effected in other ways. For example, the solid adsorbent may be placed in an adsorption column and the organic mixture caused to percolate through the adsorption column. Alternatively, the organic mixture may be caused to move countercurrently with respect to a downwardly moving bed of adsorbent in an adsorption zone. Contact might also be effected by merely adding the solid adsorbent to a stream of the organic mixture to be fractionated. Regardless of the method of contact employed, it is important that the conditions of contact, i. e., the conditions of temperature and pressure employed, always be such that the organic mixture is maintained in the liquid phase. A temperature in the range of 50° F.–400° F. or higher, preferably in the range 75° F.–200° F. and a pressure in the range 0–10,000 p. s. i. g. are suitable in the practice of this invention.

Following the adsorption step, the solid adsorbent and the unadsorbed component or treated effluent may be separated by physical means such as filtration, decantation, and displacement in order to separate substantially all of the treated effluent from the adsorbent. The separated treated effluent now contains a reduced proportion of straight chain hydrocarbons, e. g., n-paraffins or is substantially free of straight chain hydrocarbons as well as a reduced proportion of non-straight chain polar or aromatic or unsaturated compounds. The adsorbent is treated in such a way that the different components adsorbed thereon are separately recovered to give two distinct fractions. It has been discovered that the non-straight chain more-polar or aromatic or unsaturated component adsorbed on the surface of the solid adsorbent may be selectively desorbed in various ways without desorbing or removing to a substantial extent the pore-adsorbed straight chain hydrocarbons. This is accomplished by employing relatively mild desorption conditions. Such mild desorption may be effected by contacting or washing the adsorbent with a compound that is more polar than the surface adsorbed compounds or preferentially adsorbed thereover. Suitable washing liquids include the non-straight chain aliphatic amines, e. g., isopropylamine, $NH_3, SO_2, H_2O$, pyridine etc., depending upon the character of the surface adsorbed compounds. Other suitable desorbing agents or compounds include the non-straight chain oxygenated hydrocarbons such as the corresponding ketones, alcohols (including secondary and tertiary alcohols) acids, aldehydes, etc., e. g., tert-butyl alcohol, sec-butyl alcohol and methyl isobutyl ketone. In some instances, particularly when water is employed as the desorbing medium, surface active agents or wetting agents may advantageously be employed therein. In this treatment the more highly polar compounds will be preferentially adsorbed thus replacing the relatively less-polar surface adsorbed polar or aromatic fraction from the original organic mixture. Mild desorption may also be accomplished without the employment of a more-polar preferentially adsorbed liquid. For example, the solid adsorbent may be heated to about the boiling point of the surface adsorbed compounds until the surface adsorbed polar or aromatic or unsaturated compounds are substantially completely removed by volatilization. In this manner the surface adsorbed compounds will be substantially completely removed without substantially affecting or desorbing the pore-adsorbed material. Also, in these instances where the mild desorption is carried out by means of a more-polar organic liquid to desorb the relatively less-polar surface absorbed component, a proper selection of the desorbing liquid with respect to boiling point and/or miscibility as compared to the surface adsorbed compounds and/or pore-adsorbed hydrocarbons will simplify its subsequent separation and recovery from the surface and internally adsorbed straight chain hydrocarbons when these are recovered.

Further illustrative of the practice of this invention a selective adsorbent containing surface wetting treated effluent (mechanically held liquid) as well as pore-adsorbed straight chain hydrocarbon and surface adsorbed non-straight chain polar or aromatic or unsaturated compounds, e. g., aromatic hydrocarbon, is contacted with liquid isobutane at a temperature sufficiently high to effect separation of the surface wetting (mechanically held) and, if desired, the surface adsorbed compounds from the adsorbent, leaving the adsorbent wetted substantially only with isobutane. The adsorbent is then separately treated to desorb the pore-adsorbed straight chain hydrocarbon. The isobutane is afterwards readily separated from the desorbed surface adsorbed compounds and the desorbed pore-adsorbed hydrocarbons.

After recovering the surface adsorbed components there remains straight chain hydrocarbons adsorbed within the pores of the adsorbent. These pore-adsorbed hydrocarbons may be desorbed by heating the solid adsorbent to an even higher temperature, preferably above the critical temperature of the pore-adsorbed hydrocarbons and at the same time contacting or purging the adsorbent with a gas such as hydrogen, methane, carbon dioxide, flue gas, steam and the like. In the event that heat is employed to remove the pore-adsorbed hydrocarbons, the temperatures employed should not exceed about 1200° F. Temperatures in excess of 1200° F. tend to destroy the adsorptive properties of the solid adsorbent.

In accordance with one embodiment of the invention, a naphtha consisting of normal and branched chain aliphatic hydrocarbons, naphthenes and aromatic compounds or aromatic hydrocarbons, is contacted with an aluminosilicate adsorbent and fractionated into an effluent naphtha fraction enriched with respect to branched chain aliphatic and naphthenic hydrocarbons, a separate aromatic fraction and a separate straight chain paraffinic fraction.

Referring now to the accompanying drawing wherein there is schematically illustrated a practice of this invention, a naphtha feed containing naphthenic, n-paraffinic and isoparaffinic hydrocarbons is introduced via lines 11 and 12 into catalytic reformer 14 wherein the naphtha feed is reformed into a reformate containing aromatic, n-paraffinic and isoparaffinic hydrocarbons. The resulting reformate is recovered from catalytic reformer 14 via line 15 and passed through condenser 16 wherein the reformate is condensed and the resulting condensed, liquid reformate is passed via line 18 into selective adsorption treating zone 19. Within selective adsorption treating zone 19 the liquid reformate is contacted with a mass of particle-form solid alumino-silicate molecular sieve type adsorbent material made up of porous crystals wherein the pores of the crystals are of uniform size and have a pore size of about 5.0 Angstrom units, a pore size sufficiently large to admit straight chain hydrocarbons to the substantial exclusion of non-straight chain hydrocarbons and which adsorbent material also selectively adsorbs aromatic hydrocarbons on the surface thereof. There is recovered from selective adsorption treating zone 19 via line 20 a treated liquid reformate containing substantially only isoparaffinic hydrocarbons.

Following the removal of the treated reformate from selective adsorption treating zone 19 there is introduced into treating zone 19 via line 21 a more polar desorbing liquid, such as water, to selectively desorb and replace the surface adsorbed aromatic hydrocarbons from the molecular sieve adsorbent material within treating zone 19. The resulting desorbed aromatic hydrocarbons are separately recovered from treating zone 19 via line 22.

Following the selective desorption of the surface adsorbed aromatic hydrocarbons by replacement with a preferentially adsorbed more polar desorbing liquid, a gaseous desorbing fluid at a relatively elevated temperature is introduced into treating zone 19 via line 24 to selectively desorb from the adsorbent material contained within treating zone 19 the remaining pore adsorbed n-paraffinic hydrocarbons. The resulting desorbed n-paraffinic hydrocarbons are separately recovered from treating zone 19 via line 25. Preferably the resulting desorbed and separated n-paraffinic hydrocarbons are returned to catalytic reformer 14 via lines 25 and 12.

The following example illustrates the practice of the instant invention.

Example I 300 cc. of a platformate containing straight chain hydrocarbons (n-paraffins), non-straight chain hydrocarbons (isoparaffins) and aromatic hydrocarbons, and having a refractive index of 1.4455 at 68° F. was taken as a charge stock and transferred to a vessel provided with a mechanical mixer.

300 grams of a dehydrated alumino-silicate Linde Type 5A molecular sieve were added to this platformate, thus forming a slurry.

The mixture was agitated at room temperature (about 70° F.) and atmospheric pressure for sufficient time to provide intimate contact of the platformate with the adsorbent.

On completion of the contacting operation the unadsorbed portion of the original platformate charge was removed. This unadsorbed portion amounted to 240 cc. and had a refractive index of 1.4533.

The saturated adsorbent containing surface and pore-adsorbed hydrocarbons was placed into a distilling apparatus and subjected to mild heating at atmospheric pressure at a temperature about the boiling point of the surface adsorbed hydrocarbons to remove or desorb the surface adsorbed hydrocarbons. Fractions amounting to 14.5 cc. of distillate were obtained. These fractions had an average refractive index of 1.4580.

Upon continued heating of the selection adsorbent in the distillation apparatus to remove the pore-adsorbed hydrocarbons, an additional 36.5 cc. of distillate were recovered. This distillate fraction had an average refractive index of 1.4100.

It is apparent that the last separated distillate fraction having a refractive index of 1.4100 represents substantially all of the straight chain hydrocarbons originally present in the platformate. Straight chain hydrocarbons have refractive indices from about 1.3700 to about 1.4300. The distillate fractions having an average refractive index of 1.4580 represents the more-polar or aromatic components originally present in the original platformate and selectively adsorbed on the surface of the adsorbent. The unadsorbed portion having a refractive index of 1.4533 represents the non-straight chain and less-polar components of the platformate.

It is seen, therefore, that an organic mixture consisting of straight chain hydrocarbons, non-straight chain polar or aromatic compounds and non-straight chain relatively less-polar, unsaturated or aromatic compounds may be separated into three distinct fractions by using a solid selective adsorbent in a single contacting step according to the practice of this invention.

Example II

The following example is illustrative of the practice of this invention as applied to the treatment of a hydrocarbon fraction for the production and recovery of aromatic hydrocarbons. A hydrocarbon fraction containing straight chain hydrocarbons such as n-paraffins and non-straight chain hydrocarbons including isoparaffins and naphthenic hydrocarbons, such as may be found in a heavy straight run naphtha fraction having a boiling range in the range 200–425° F. is subjected at an elevated temperature and pressure in the vapor phase to contact with a reforming catalyst. Reforming catalysts are well-known and comprise such materials as a platinum-containing catalyst, e. g. platforming or ultraforming catalyst and the like, a cobalt molybdate catalyst, so called hyperforming catalyst, a chromia-alumina catalyst which may be identified as a sovaforming or thermofor catalytic reforming catalyst, a molybdena-alumina catalyst, sometimes referred to as a hydroforming or orthoforming catalyst, and the like. Upon contact with the reforming catalyst the hydrocarbons making up the naphtha fraction undergoing reforming are substantially simultaneously dehydrogenated, isomerized and aromatized or dehydrocyclized. A certain amount of cracking and disproportionation of the hydrocarbons also takes place depending upon the severity of catalytic reforming. Generally the catalytic reforming operation is carried out at a temperature in the range 750–1100° F., and at a pressure in the range 40–1000 p. s. i. g., more or less, desirably in the presence of hydrogen. As a result of the catalytic reforming operation there is produced a catalytic reformate having an increased proportion of aromatic hydrocarbons as compared to the original naphtha fraction together with other non-straight chain and straight chain hydrocarbons such as isoparaffinic, naphthenic and n-paraffinic hydrocarbons. The resulting catalytic reformate, after separation of hydrogen (a part of which is advantageously recycled to the reforming operation) and the relatively low molecular weight hydrocarbons ($C_4$ and lighter), cooling and condensation, is treated in the liquid phase by contact with an alkaline earth metal alumino-silicate of the type described herein, such as a Linde type 5A molecular sieve, to effect adsorption of the aromatic hydrocarbons on the surface of the alumino-silicate adsorbent, and adsorption of the straight chain hydrocarbon, n-paraffins, present in the reformate, within the pores of the alumino-silicate adsorbent. Following the liquid phase contacting-adsorption operation there is recovered a treated liquid catalytic reformate substantially free of or having a reduced proportion of aromatic hydrocarbons as well as having a relatively reduced straight chain hydrocarbon content. This resulting treated catalytic reformate, comprised predominantly of isoparaffinic and naphthenic hydrocarbons is advantageously recycled to the aforesaid catalytic reforming operation for the production of additional aromatic hydrocarbons.

The aromatic hydrocarbons adsorbed on the surface of the adsorbent are separately desorbed in accordance with the practice of this invention and are recovered as a separate product. Subsequent to the selective desorption of the surface adsorbed aromatic hydrocarbons the pore-adsorbed straight chain hydrocarbons, e. g. n-paraffins, are desorbed and separately recovered. Advantageously the desorbed straight chain hydrocarbons, n-paraffins, are subjected to a subsequent isomerization or aromatization operation for the production of corresponding branched chain hydrocarbons, isoparaffins, or aromatic hydrocarbons. If desired, the branched chain hydrocarbons resulting from the isomerization operation may be recycled to the catalytic reforming operation for the production of still more additional aromatic hydrocarbons. By operating in the above-indicated manner, it is possible to convert substantially all of the hydrocarbons in the original naphtha fraction to aromatic hydrocarbons.

Further illustrative of the practice of this invention a mixture of straight chain hydrocarbons comparable to the mixture of straight chain hydrocarbons which are desorbed from the adsorbent following contact with the catalytic reformate, and comprising 23% by volume n-pentane, 56% by volume n-hexane and 21% by volume n-heptane was contacted with a particle-form dehydrogenation-aromatization catalyst comprising $C_2O_3MgO—Al_2O_3$ at various temperatures and at a space velocity of about 0.4 v./hr./v. at a pressure of about 40 p. s. i. g. and at a $H_2$ recycle rate of 1200 cu. ft./bbl. of feed. The properties of the resulting upgraded product, having a substantial amount of aromatic hydrocarbons are set forth in Table No. I.

TABLE NO. I

| Temp., °F | 920 | 943 |
|---|---|---|
| Wt. percent recovery | 93.8 | 81.3 |
| Bromine number | 20 | 22 |
| Vol. percent aromatics | 15 | 13 |
| ASTM res. clear oct. prod | 60.6 | 57.6 |
| +3 cc. TEL/gal | 80.4 | 80.2 |

The same mixture of straight chain hydrocarbons was contacted with a number of platinum-containing reforming or predominantly isomerizing catalysts at a pressure of about 500 p. s. i. g., a $H_2$ recycle rate of about 4000 cu. ft./bbl. charge. The results are set forth in Table No. II.

TABLE NO. II

| Temp., °F | 800 | | | 850 | | | 900 | | |
|---|---|---|---|---|---|---|---|---|---|
| Catalyst | A | B | C | A | B | C | A | B | C |
| Liquid rec., wt. percent | 95.9 | 99.3 | 90.1 | 95.0 | 99.0 | 88.2 | 67.6 | 70.1 | 72.7 |
| Octane numbers: | | | | | | | | | |
| Isomate ASTM res., clear | 60.6 | 51.0 | 54.0 | 75.4 | 74.0 | 77.1 | 89.6 | 70.0 | 78.0 |
| Treated product ASTM res., clear | 78.0 | 61.0 | 72.0 | 84.0 | 82.0 | 82.6 | | 80.3 | |
| Treated product +3 cc. TEL/gal | | 86.0 | | | | | | | |

A—Platforming catalyst
B—Sinclair-Baker rd 150 catalyst
C—Ultraforming catalyst

Following the isomerization reaction, the isomate is recovered and may be subjected to reforming or aromatization for the production of additional aromatic hydrocarbons, which are separated and recovered from the resulting product in accordance with this invention.

It is a special feature of this invention to carry out the contacting of the liquid mixture to be separated and the solid selective adsorbent by forming a slurry and passing the slurry to a rotary filter wherein there is separately recovered as filtrate a treated liquid mixture, now having a substantially reduced proportion of straight chain hydrocarbons and having a substantially reduced proportion of non-straight chain more-polar or aromatic or unsaturated compounds. At the same time, there is deposited or laid down on the filtering surface a filter cake of solid adsorbent wetted with mechanically held treated liquid mixture. This filter cake of selective adsorbent is then washed with a liquid, preferably a nonstraight chain hydrocarbon, e. g. isobutane, which is readily separated from the hydrocarbons comprising the liquid mixture. Following washing the filter cake of selective adsorbent is subjected to a sequence of hot gas purges, first to remove the surface adsorbed more-polar or aromatic or unsaturated compounds, and subsequently the more strongly adsorbed pore-adsorbed straight chain hydrocarbons. This selective desorption of the surface adsorbed compounds followed by desorption of the pore-adsorbed straight chain hydrocarbons may be accomplished by passing a hot gaseous medium such as methane, hydrogen, flue gas and the like through the filter cake of adsorbent under controlled temperature conditions. The resulting formed filter cake now containing relatively desorbed-regenerated absorbent is returned on the surface of the filter drum to contact additional liquid mixture to be treated or is removed from the filter drum and contacted with additional fresh liquid mixture to form more slurry.

In accordance wth still another feature of this invention a bed or filter cake of solid selective adsorbent is formed on the working face of a rotary filter and the liquid mixture undergoing separation into at least three components is sprayed on to the one section thereof to produce a treated mixture or filtrate substantially free of straight chain hydrocarbons. As the filter drum rotates that section thereof now containing pore-adsorbed straight chain hydrocarbons as well as the surface adsorbed more-polar compounds, and the mechanically held surface wetting treated mixture is subjected to air blowing or vacuum or to an isobutane wash to remove the surface wetting treated mixture. Following this operation the selective adsorbent, in still another section of the rotary filter is subjected to contact with a hot gaseous fluid under controlled temperature so as to effect in sequence the separate desorption of the surface adsorbed polar or aromatic compounds, followed by the separate desorption of the pore-adsorbed straight chain hydrocarbons, each being separately recovered.

The foregoing example and description are for the purpose of illustration only, and no limitation not expressly recited in the appended claims shall be deduced therefrom.

We claim:

1. A process for upgrading petroleum naphtha comprising n-paraffinic hydrocarbons and isoparaffinic hydrocarbons and aromatic hydrocarbons which comprises contacting said naphtha in the liquid phase with a solid molecular sieve alumino-silicate selective adsorbent made up of porous crystals wherein the pores of the crsytals are of uniform size and have a pore size of about 5.0 Angstrom units, a pore size sufficient to admit straight chain hydrocarbons to the substantial exclusion of non-straight chain hydrocarbons, and which selectively adsorbs straight chain hydrocarbons within the pores of the adsorbent to the substantial exclusion of non-straight chain hydrocarbons and which selectively adsorbs aromatic hydrocarbons on the surface of said adsorbent to remove said n-paraffinic hydrocarbons and said aromatic hydrocarbons from said naphtha, separating the unadsorbed isoparaffinic hydrocarbons from the resulting admixture, separately selectively desorbing the surface adsorbed aromatic hydrocarbons by contacting said adsorbent with a desorbing fluid selected from the group consisting of a liquid more polar than said surface adsorbed aromatic hydrocarbons which is preferentially adsorbed by said adsorbent over said surface adsorbed aromatic hydrocarbons and a fluid at a temperature at about the boiling point of the surface adsorbed aromatic hydrocarbons, recovering the resulting selective adsorbent material having a substantially reduced amount of aromatic hydrocarbons adsorbed on the surface thereof and thereafter separately desorbing the pore adsorbed n-paraffinic hydrocarbons therefrom.

2. A method of fractionating a liquid hydrocarbon mixture comprising straight chain hydrocarbons, isoparaffinic hydrocarbons, naphthenic hydrocarbons and aromatic hydrocarbons which comprises contacting said mixture in the liquid phase with a solid molecular sieve alumino-silicate selective adsorbent made up of porous crystals wherein the pores of the crystals are of uniform size and have a pore size of about 5.0 Angstrom units, a pore size sufficient to admit straight chain hydrocarbons to the substantial exclusion of non-straight chain hydrocarbons, and which selectively adsorbs straight chain hydrocarbons within the pores of the adsorbent to the substantial exclusion of non-straight chain hydrocarbons and which selectively adsorbs aromatic hydrocarbons on the surface of the adsorbent to remove said straight chain hydrocarbons and said aromatic hydrocarbons from said hydrocarbon mixture, separating the remaining unadsorbed liquid hydrocarbon mixture containing isoparaffinic hydrocarbons and naphthenic hydrocarbons from the resulting admixture, separately selectively desorbing the surface adsorbed aromatic hydrocarbons by contacting said adsorbent with a desorbing fluid selected from the group consisting of a liquid more polar than said surface adsorbed aromatic hydrocarbons which is preferentially absorbed by said adsorbent over said surface adsorbed aromatic hydrocarbons and a fluid at a temperature at about the boiling point of the surface adsorbed aromatic hydrocarbons, recovering the resulting selective adsorbent material now having a substantially reduced amount of aromatic hydrocarbons adsorbed on the surface thereof and separately desorbing the pore adsorbed straight chain hydrocarbons from the thus-treated selective adsorbent.

3. A method of fractionating a liquid hydrocarbon mixture comprising straight chain hydrocarbons, naphthenic hydrocarbons and isoparaffinic hydrocarbons which comprises contacting said mixture with a solid molecular sieve alumino-silicate selective adsorbent made up of porous crystals wherein the pores of the crystals are of uniform size and have a pore size of about 5.0 Angstrom units, a pore size sufficient to admit straight chain hydrocarbons to the substantial exclusion of non-straight chain hydrocarbons, and which selectively adsorbs straight chain hydrocarbons within the pores of the adsorbent to the substantial exclusion of non-straight chain hydrocarbons and which selectively adsorbs naphthenic hydrocarbons with respect to said isoparaffinic hydrocarbons on the surface of the adsorbent to remove said straight chain hydrocarbons and said naphthenic hydrocarbons from said mixture, separating the resulting treated liquid hydrocarbon mixture containing unadsorbed isoparaffinic hydrocarbons, separately selectively desorbing the surface adsorbed naphthenic hydrocarbons from said adsorbent by contacting said adsorbent with a desorbing fluid selected from the group consisting of a liquid more polar than said naphthenic hydrocarbons which is preferentially adsorbed by said adsorbent over said surface adsorbed naphthenic hydrocarbons and a fluid at a temperature at about the boiling point of the surface adsorbed naphthenic hydrocarbons, recovering said adsorbent now having a reduced amount of naphthenic hydrocarbons adsorbed on the surface thereof and separately desorbing the pore adsorbed straight chain hydrocarbons from the thus-treated selective adsorbent.

4. A method of separating a liquid mixture comprising n-olefinic hydrocarbons, aromatic hydrocarbons and iso-olefinic hydrocarbons which comprises contacting said mixture in the liquid phase with a solid molecular sieve alumino-silicate selective adsorbent made up of porous crystals wherein the pores of the crystals are of uniform size and have a pore size of about 5.0 Angstrom units, a pore size sufficient to admit straight chain hydrocarbons to the substantial exclusion of non-straight chain hydrocarbons, and which selectively adsorbs n-olefinic hydrocarbons within the pores of the adsorbent to the substantial exclusion of non-straight chain hydrocarbons and which selectively adsorbs said aromatic hydrocarbons from the surface of said adsorbent to remove said n-olefinic hydrocarbons and said aromatic hydrocarbons from said liquid hydrocarbon mixture, separating the treated hydrocarbon mixture containing the unadsorbed isoolefinic hydrocarbons from the resulting admixture, separately selectively desorbing the surface adsorbed aromatic hydrocarbons from said selective adsorbent by contacting said adsorbent with a desorbing fluid selected from the group consisting of a liquid more polar than said surface adsorbed aromatic hydrocarbons which is preferentially adsorbed by said adsorbent over said surface adsorbed aromatic hydrocarbons and a fluid at a temperature at about the boiling point of the surface adsorbed aromatic hydrocarbons, recovering the thus-treated selective adsorbent containing the n-olefinic hydrocarbons adsorbed within the pores thereof and separately desorbing the n-olefinic hydrocarbons from said adsorbent.

5. A method of separating a liquid mixture comprising n-paraffinic hydrocarbons, aromatic hydrocarbons and isoolefinic hydrocarbons which comprises contacting said hydrocarbon mixture in the liquid phase with a solid molecular sieve alumino-silicate selective adsorbent made up of porous crystals wherein the pores of the crystals are of uniform size and have a pore size of about 5.0 Angstrom units, a pore size sufficient to admit straight chain hydrocarbons to the substantial exclusion of non-straight chain hydrocarbons, and which selectively adsorbs n-paraffinic hydrocarbons within the pores of the adsorbent to the substantial exclusion of non-straight chain hydrocarbons and which selectively adsorbs aromatic hydrocarbons on the surface of said adsorbent to remove said n-paraffinic hydrocarbons and said aromatic hydrocarbons from said mixture, separating the remaining unadsorbed isoolefinic hydrocarbons from the resulting admixture, separately selectively desorbing the aromatic hydrocarbons from the surface of said adsorbent by contacting said adsorbent with a relatively more polar liquid compound and separately desorbing the pore adsorbed n-paraffinic hydrocarbons from the thus-treated selective adsorbent.

6. A method of fractionating a liquid hydrocarbon mixture containing straight chain hydrocarbons, more polar non-straight chain hydrocarbons and relatively less polar non-straight chain hydrocarbons which comprises contacting said liquid mixture with a solid molecular sieve alumino-silicate selective adsorbent made up of porous crystals wherein the pores of the crystals are of uniform size and have a pore size of about 5.0 Angstrom units, a pore size sufficient to admit straight chain hydrocarbons to the substantial exclusion of non-straight chain hydrocarbons, and which selectively adsorbs straight chain hydrocarbons within the pores of the adsorbent to the substantial exclusion of non-straight chain hydrocarbons and which selectively adsorbs more polar non-straight chain hydrocarbons on the surface of said adsorbent to remove concomitantly said straight chain hydrocarbons and said more polar non-straight chain hydrocarbons from said liquid mixture, passing the resulting admixture containing a treated liquid hydrocarbon mixture now having a relatively reduced straight chain hydrocarbon and more polar non-straight chain hydrocarbon content and said solid adsorbent containing pore adsorbed straight chain hydrocarbons and non-straight chain more polar hydrocarbons to a filtration zone to remove said treated hydrocarbon liquid mixture from said selective adsorbent, washing the separated solid adsorbent with a liquid non-straight chain paraffinic hydrocarbon to displace the mechanically held treated liquid mixture therefrom, subsequently subjecting the resulting washed selective adsorbent, now substantially free of mechanically held treated liquid hydrocarbon mixture, to contact with a gas at a temperature substantially equal to the boiling point of the surface adsorbed non-straight chain more polar hydrocarbons adsorbed on the surface of the adsorbent to selectively desorb said more polar non-straight chain hydrocarbons, and subsequently contacting said adsorbent with a desorbing gas at a temperature sufficiently high to desorb the pore adsorbed straight chain hydrocarbons from said adsorbent.

7. A process for fractionating a liquid hydrocarbon mixture containing straight chain hydrocarbons, aromatic hydrocarbons and non-straight chain non-aromatic hydrocarbons which comprises forming a fixed filtering bed of solid particle-form molecular sieve alumino-silicate selective adsorbent made up of porous crystals wherein the pores of the crystals are of uniform size and have a pore size of about 5.0 Angstrom units, a pore size sufficient to admit straight chain hydrocarbons to the substantial exclusion of non-straight chain hydrocarbons, and material which selectively adsorbs straight chain hydrocarbons within the pores of said adsorbent and which selectively adsorbs aromatic hydrocarbons on the surface of said adsorbent, contacting said formed filtering bed of selective adsorbent with said liquid hydrocarbon mixture to adsorb concomitantly said aromatic hydrocarbons and said straight chain hydrocarbons with the resulting production of a treated liquid hydrocarbon mixture having a substantially reduced proportion of straight chain hydrocarbons and aromatic hydrocarbons, separately desorbing the surface adsorbed aromatic hydrocarbons and the pore adsorbed straight chain hydrocarbons from said adsorbent by subjecting said adsorbent to an elevated temperature $T_1$ substantially equal to the boiling point of the surface adsorbed aromatic hydrocarbons, subsequently subjecting the resulting treated bed of selective adsorbent now containing substantially only pore adsorbed straight chain hydrocarbons to an elevated temperature $T_2$, $T_2$ being greater than $T_1$, to effect desorption of the pore adsorbed straight chain hydrocarbons from said adsorbent.

8. A method of treating a hydrocarbon fraction containing naphthenic hydrocarbons, normal paraffinic hydrocarbons and isoparaffinic hydrocarbons which comprises subjecting said fraction to catalytic reforming for the production of a liquid reformate having an increased proportion of aromatic hydrocarbons with respect to said hydrocarbon fraction, together with the normal paraffinic hydrocarbons and non-straight chain hydrocarbons other than said aromatic hydrocarbons, contacting said reformate wtih a particle-form alumino-silicate adsorbent made up of porous crystals wherein the pores of the crystals are of uniform size and have a pore size of about 5.0 Angstrom units, a pore size sufficient to admit straight chain hydrocarbons to the substantial exclusion of non-straight chain hydrocarbons, which selectively adsorbs aromatic hydrocarbons on the surface thereof and which selectively adsorbs straight chain hydrocarbons within the pores of said adsorbent to the substantial exclusion of non-straight chain hydrocarbons, to separate aromatic hydrocarbons and normal paraffinic hydrocarbons from said reformate thereby producing a treated reformate having a reduced proportion of aromatic hydrocarbons and normal paraffinic hydrocarbons, separating said treated reformate, separately desorbing the surface adsorbed aromatic hydrocarbons by contacting said adsorbent with a desorbing fluid selected from the group consisting of a liquid more polar than said surface adsorbed aromatic hydrocarbon which is preferentially adsorbed by said adsorbent over said surface adsorbed aromatic hydrocarbons and a fluid at a temperature at about the boiling point of the surface adsorbed aromatic hydrocarbons, subsequently separately desorbing the pore-adsorbed normal paraffinic hydrocarbons from said adsorbent, and recycling said treated reformate to the catalytic reforming operation for the production of additional aromatic hydrocarbons.

References Cited in the file of this patent

UNITED STATES PATENTS

| | | |
|---|---|---|
| 2,425,535 | Hibshman | Aug. 12, 1947 |
| 2,442,191 | Black | May 25, 1948 |
| 2,574,434 | Greentree | Nov. 6, 1951 |
| 2,586,889 | Vesterdal | Feb. 26, 1952 |
| 2,736,684 | Tarnpoll | Feb. 28, 1956 |

OTHER REFERENCES

Barrer: Soc. of Chem. Ind. J., vol. 64, pages 131–133, May 1945.